United States Patent
Kim et al.

(10) Patent No.: US 10,849,017 B2
(45) Date of Patent: **\*Nov. 24, 2020**

(54) METHODS AND APPARATUS TO OPTIMIZE POWER CONSUMPTION AND CAPACITY IN A MULTI-MODE COMMUNICATION SYSTEM

(71) Applicant: TEXAS INSTRUMENTS INCORPORATED, Dallas, TX (US)

(72) Inventors: Wonsoo Kim, Allen, TX (US); Il Han Kim, Allen, TX (US)

(73) Assignee: Texas Instruments Incorporated, Dallas, TX (US)

( \* ) Notice: Subject to any disclaimer, the term of this patent is extended or adjusted under 35 U.S.C. 154(b) by 41 days.

This patent is subject to a terminal disclaimer.

(21) Appl. No.: 16/383,146

(22) Filed: Apr. 12, 2019

(65) Prior Publication Data

US 2019/0239121 A1 Aug. 1, 2019

Related U.S. Application Data

(63) Continuation of application No. 15/457,477, filed on Mar. 13, 2017, now Pat. No. 10,313,928.

(51) Int. Cl.
| | |
|---|---|
| *G06F 1/26* | (2006.01) |
| *G06F 1/32* | (2019.01) |
| *H04W 28/08* | (2009.01) |
| *H04W 52/02* | (2009.01) |
| *H04W 52/38* | (2009.01) |

(52) U.S. Cl.
CPC ....... *H04W 28/08* (2013.01); *H04W 52/0258* (2013.01); *H04W 52/38* (2013.01)

(58) Field of Classification Search
None
See application file for complete search history.

(56) References Cited

U.S. PATENT DOCUMENTS

| | | |
|---|---|---|
| 2003/0031235 A1 | 2/2003 | Kim |
| 2005/0286617 A1 | 12/2005 | Lilja |
| 2012/0246331 A1 | 9/2012 | Heller |
| 2014/0254518 A1 | 9/2014 | Wentink |
| 2015/0223047 A1 | 8/2015 | Abraham |

*Primary Examiner* — Nitin C Patel
(74) *Attorney, Agent, or Firm* — Brian D. Graham; Charles A. Brill; Frank D. Cimino

(57) ABSTRACT

A utilization factor controller is to estimate power consumption values corresponding to a plurality of first utilization factor and second utilization factor pairs, the first utilization factor corresponding to utilization of the first transceiver that is to communicate using a first protocol, the second utilization factor corresponding to utilization of the second transceiver that is to communicate using a second protocol different form the first protocol, the utilization factor controller to select a first utilization factor and second utilization factor pair based on the estimated power consumption value. A transmission time controller is to calculate first and second transmission times to be used by the first and second transceiver based on the selected first utilization factor and second utilization factor pair. A data allocator is to allocate data for transmission by the first transceiver and the second transceiver according to the first and second transmission times.

20 Claims, 6 Drawing Sheets

US 10,849,017 B2

METHODS AND APPARATUS TO OPTIMIZE POWER CONSUMPTION AND CAPACITY IN A MULTI-MODE COMMUNICATION SYSTEM

This application is a continuation of prior application Ser. No. 15/457,477, filed Mar. 13, 2017 (now U.S. Pat. No. 10,313,928), entitled "Methods and Apparatus to Optimize Power Consumption and Capacity in a Multi-mode Communication System,", which is hereby incorporated by reference herein in its entirety.

FIELD OF THE DISCLOSURE

This disclosure relates generally to multi-mode communications systems, and, more particularly, to methods and apparatus to optimize power consumption and capacity in a multi-mode communication system.

BACKGROUND

Some communications systems utilize multiple transceivers for communication. In some examples, the transceivers operate using different communications protocols and/or architectures. For example, a first transceiver may utilize radio frequency communications, while a second transceiver may utilize power line communications. Communications systems designers seek to utilize each of the transceivers as efficiently as possible.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Recent developments in multi-mode communication systems (e.g., communications systems used in smart grid environments) attempt to implement communication systems that achieve higher data rates while consuming less power. For example, some communications systems utilize radio frequency (RF) communications (e.g., Institute of Electrical and Electronics Engineers (IEEE) 802.15.4g) in combination with power-line communication (PLC) systems (e.g., PoweRline Intelligent Metering Evolution (PRIME), G3, IEEE 1901.2, etc.). In some examples, communications systems designers seek to utilize two or more communications technologies in parallel to communicate more quickly and/or efficiently.

An example advantage of using a multi-mode communications system is that the communication channels may be isolated from each other. For example, in a multi-mode communication system that utilizes RF and PLC transceivers, the RF channels are sub-1 GHz or 2.4 MHz Industrial Scientific and Medical (ISM) band (for IEEE 802.15.4g, ZigBee, etc.), while the PLC channels are less than 500 kilohertz (kHz). Thus, the channels used by each of the transceivers are independent. In examples disclosed herein, each of the multi-mode transceivers are utilized in parallel to achieve higher data rates and minimize energy consumption.

Example approaches disclosed herein are different from known multiplexing techniques, such as multi-input and multi-output (MIMO). MIMO techniques attempt to maximize network capacity by allocating the same amount of data to each antenna. In MIMO systems, each of the antennas utilizes a same physical (PHY) method (i.e., the communication channels are symmetric). However, the same technique cannot be applied to the combined RF and PLC communications because of the asymmetric nature of the communication techniques. For example, attempting to transmit the same amount of data over two asymmetric communication technologies will cause a bottleneck on the lower rate channel, thereby preventing the system from utilizing full network capacity of each of the channels.

Example approaches disclosed herein utilize a full capacity of asymmetric multi-mode communications systems by calculating an amount of data to be transmitted by each modem (e.g., an RF modem and a PLC modem) based on an equivalent time for packet delivery, not based on an amount of data.

While examples disclosed herein describe optimization procedures for scheduling data for transmission in a two transceiver system using an RF transceiver and a PLC transceiver. Such an approach is equally applicable to any other types of transceivers used in a two transceiver system, and is also applicable to systems that utilize more than two transceivers.

Figure 1:
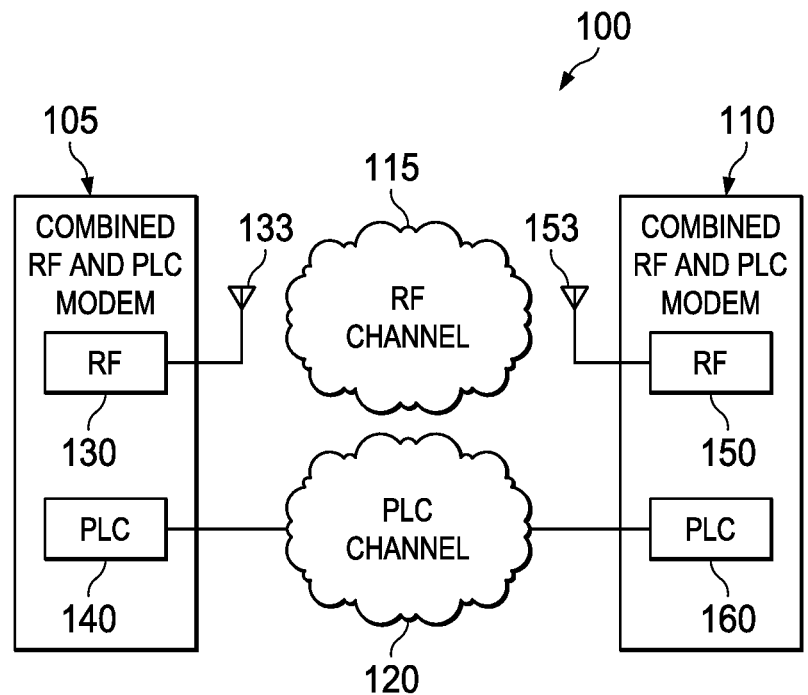
FIG. 1 is a block diagram of an example multi-mode communication system.

FIG. 1 is a block diagram of an example multi-mode communication system 100. The example communication system includes a first modem 105 and a second modem 110. In the illustrated example of FIG. 1, the first and second modems 105, 110 communicate via a first communication channel 115 and a second communication channel 120. In the illustrated example of FIG. 1 the first communication channel is a radio frequency RF channel, and the second communication channel 120 is a powerline communication channel. However, any other communication channel technologies may additionally or alternatively be used. Moreover, in some examples, more than two communication channels may be used. In examples disclosed herein, a technology used by the first communication channel 115 is different from than a technology used by the second communication channel 120.

In the illustrated example of FIG. 1, the first modem 105 includes a first transceiver 130 (e.g., an RF transceiver) that communicates over the first communication channel 115 using a first antenna 133. In the illustrated example of FIG. 1, the first transceiver 130 utilizes an IEEE 802.15.4g wireless communication protocol. However, any other past present, and/or future wireless communication protocols and or technologies may additionally or alternatively be used. The first modem 105 includes a second transceiver 140 (e.g. a PLC transceiver) that communicates over the second communication channel 120. The second example transceiver 140 utilizes an IEEE 1901.2 powerline communication protocol. However, any other past, present, and/or future powerline communication protocols and or technologies may additionally alternatively be used. Moreover, while in the illustrated example of FIG. 1 radio frequency and powerline communications are shown, the first transceiver and the second transceiver may be implemented using any other tech past, present, and/or future communications protocols and or technologies.

In the illustrated example of FIG. 1, the second transceiver 140 is electrically connected to the second communication channel 120. In contrast, the first transceiver 130 is wirelessly connected to the first communication channel 115. However, in some examples, the first transceiver and the second transceiver may be electrically connected to their respective communication channels, the first transceiver and the second transceiver may be wirelessly connected to their respective communication channels, etc.

In the illustrated example of FIG. 1, the second modem 110 includes a third transceiver 150 (e.g., an RF transceiver) that communicates over the first communication channel 115 using a second antenna 153. The second modem 110 includes a fourth transceiver 160 (e.g., a PLC transceiver) that communicates over the second communication channel 120. In the illustrated example of FIG. 1, the fourth transceiver 160 is electrically connected to the second communication channel 120. Like the first transceiver 130 of the first modem 105, the third transceiver 150 is wirelessly connected to the first communication channel 115. As noted above in connection with the first modem, the first transceiver and the second transceiver may be implemented using any type of communication technology and may be electrically and/or wirelessly connected to their respective communication channels accordingly.

Figure 2:
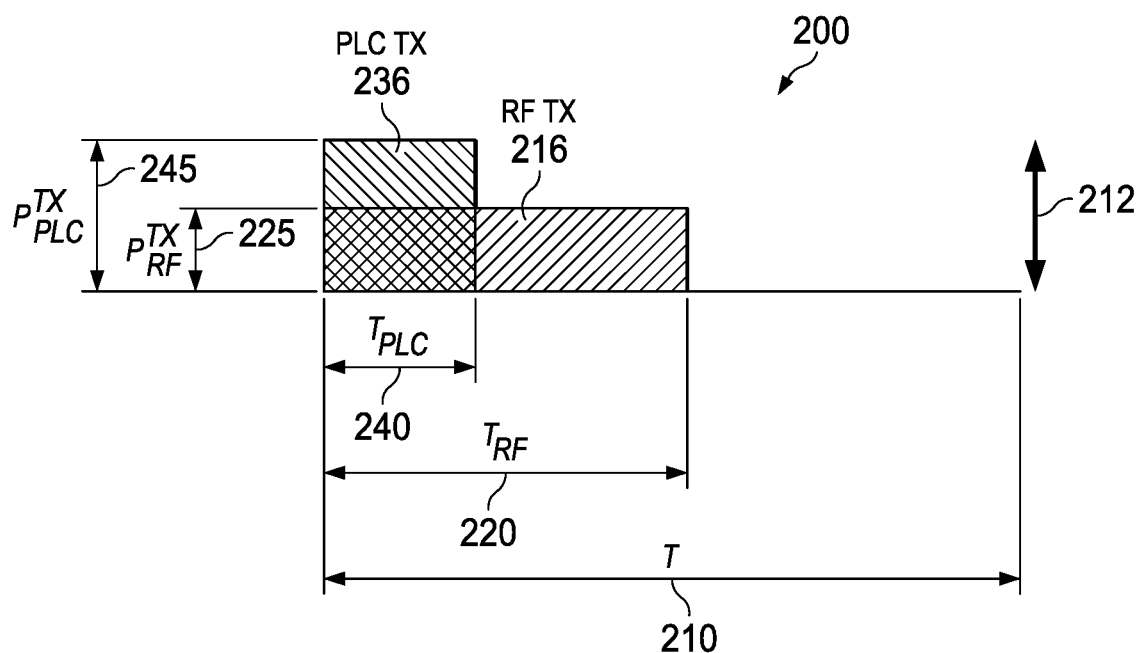
FIG. 2 is a power and timing diagram representing power consumption and transmission times of the first and second transceivers of the multi-mode communication system of FIG. 1.

FIG. 2 is a power and timing diagram 200 representing power consumption and transmission times of the first and second transceivers 130, 140 of the multi-mode communication system of FIG. 1. In the illustrated example of FIG. 2, a horizontal axis 210 represents time. A vertical axis 212 represents an amount of instantaneous power consumed by a transceiver (e.g., the first transceiver 130, the second transceiver 140).

In the illustrated example of FIG. 2, a first block 216 represents an amount of power consumed by the first transceiver 130 while transmitting for an amount of time $T_{RF}$ 220. In the illustrated example of FIG. 1, the first transceiver 130 transmits for the time $T_{RF}$ 220, and such transmitting consumes an amount of power represented by $P_{RF}^{TX}$ 225. In the illustrated example of FIG. 2, a second block 236 represents an amount of power consumed by the second transceiver 140 while transmitting for an amount of time $T_{PLC}$ 240. In the illustrated example of FIG. 1, the second transceiver 140 transmits for the time $T_{PLC}$ 240, and such transmitting consumes an amount of power represented by $P_{PLC}^{TX}$ 245. In the illustrated example of FIG. 2, transmitting with the example second transceiver 140 consumes more power than transmitting with the example first transceiver 130. Examples disclosed herein seek to find the optimal amount of data ($S_{PLC}$, and $S_{RF}$, where $S=S_{PLC}+S_{RF}$) to satisfy the equivalent delivery time ($T_{PLC}=T_{RF}$) given the network capacities ($C_{RF}$, $C_{PLC}$) of the respective connections. The amounts of data $S_{PLC}$, and $S_{RF}$ can be calculated as shown below in Equations 1 and 2.

$$S_{PLC} = \frac{C_{PLC}}{C_{PLC} + C_{RF}} S \qquad \text{Equation 1}$$

$$S_{RF} = \frac{C_{RF}}{C_{PLC} + C_{RF}} S \qquad \text{Equation 2}$$

In the example Equations 1 and 2, the network capacities ($C_{RF}$ and $C_{PLC}$) are a function of various real-world factors such as, for example, physical capacity, network utilization, etc. In examples disclosed herein, transmission times of a first transceiver and a second transceiver are scheduled to minimize power consumption (or equivalently, energy consumption), within a few constraints.

A first example constraint is that during the time period T 210, the system is expected to transmit at least $R_{min}T$ bits, where $R_{min}$ represents the minimum expected data transmission rate in bits per second.

A second example constraint is that the RF transceiver (e.g., a first transceiver) supports a mode with $R_{RF}$ bits per second and the PLC transceiver (e.g., a second transceiver) supports a mode with $R_{PLC}$ bits per second.

A third example constraint is that $T_{RF}$ 220 and $T_{PLC}$ 240 represent transmission times of the RF transceiver (e.g., the first transceiver) and the PLC transceiver (e.g., the second transceiver), respectively. As used herein, a transmission time is a period of time in which a transceiver is allowed to operate in a transmit mode. In examples disclosed herein, $T_{RF}$ 220 is less than or equal to T 210. Likewise, $T_{PLC}$ 240 is less than or equal to T 210.

A fourth example constraint is that $P_{RF}^{TX}$ 225 and $P_{PLC}^{TX}$ 245 represent transmit powers for the RF transceiver (e.g., the first transceiver) and the PLC transceiver (e.g., the second transceiver), respectively. In the illustrated example of FIG. 2, $P_{PLC}^{TX}$ 245 is greater than $P_{RF}^{TX}$ 225 because, for example, the PLC transceiver consumes more power than the RF transceiver when transmitting data. However, in some examples, the PLC transceiver may consume power at a level that is lesser than or equal to the power consumption level of the RF transceiver.

A fifth example constraint is that the RF transceiver and the PLC transceiver go to receive modes upon completion of the transmission. In examples disclosed herein, the transceiver(s) enters a receive mode. However, the transceiver(s) may enter any other mode such as, for example, an idle mode, a standby mode, etc. The receiving time of RF transceiver is represented by $T-T_{RF}$, and the receiving time of the PLC transceiver is represented by $T-T_{PLC}$. The power consumption during the receiving states is represented as $P_{RF}^{RX}$ (for the RF transceiver) and $R_{PLC}^{RX}$ (for the PLC transceiver).

A sixth example constraint is that $\alpha_{RF}$ and $\alpha_{PLC}$ represent are RF and PLC utilization factors, respectively. Each of $\alpha_{RF}$ and $\alpha_{PLC}$ are bounded between zero and one, with zero representing no utilization and one representing full utilization. For example, if $\alpha_{RF}=1$ and $\alpha_{PLC}=0$, then only RF transceiver is used in the system. If $\alpha_{RF}=1$ and $\alpha_{PLC}=1$, then both RF and PLC links are fully used.

Figure 3:
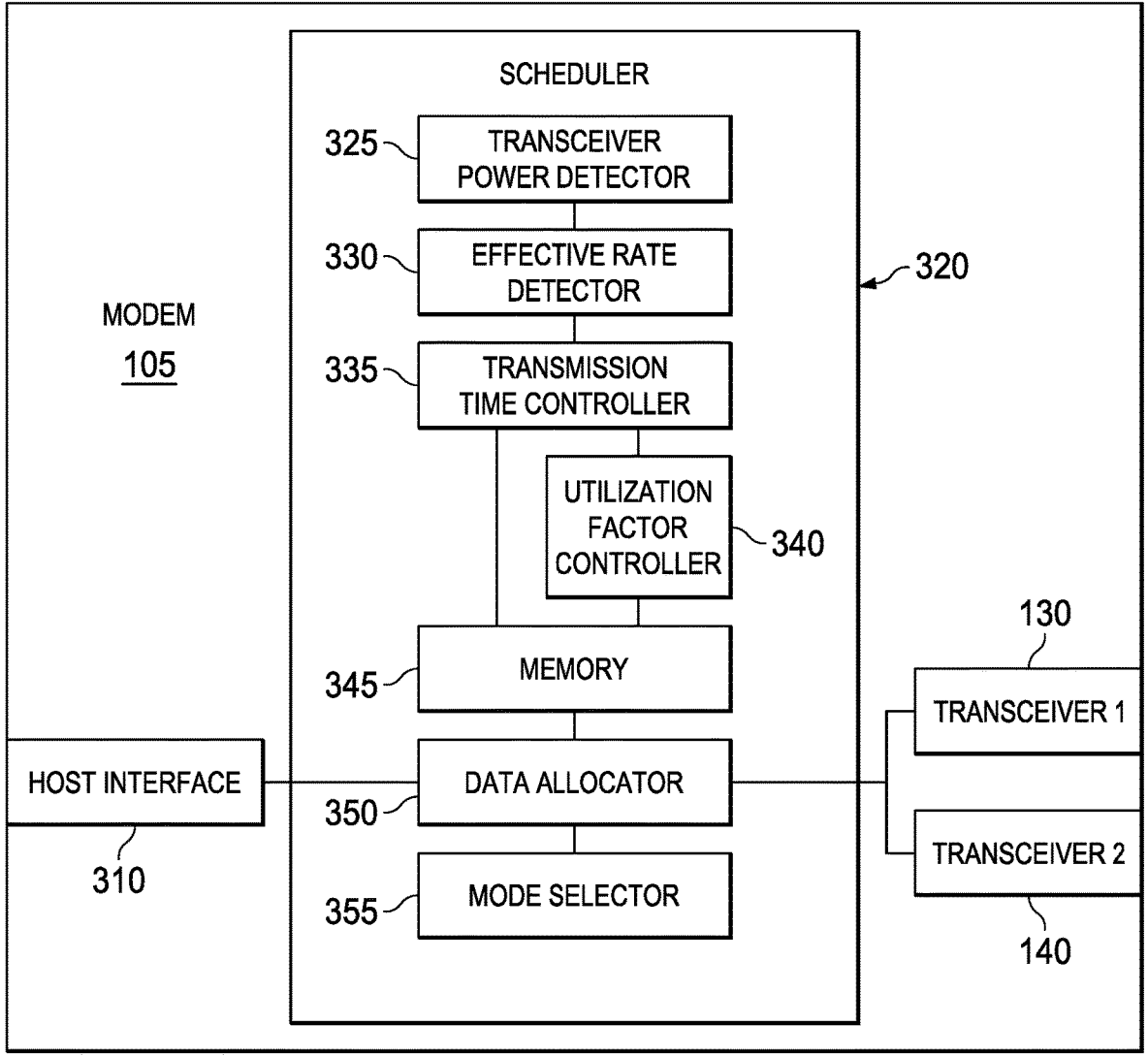
FIG. 3 is a block diagram representing an example implementation of the example modem of FIG. 1.

FIG. 3 is a block diagram representing an example implementation of the example modem 105 of FIG. 1. The example modem 105 of the illustrated example of FIG. 3 includes a host interface 310, scheduler 320, the first transceiver 130 of FIG. 1, and the second transceiver 140 of FIG. 1. The example host interface 310 receives data to be transmitted from a host. The example scheduler 320 schedules and or allocates that data for transmission via either the first example transceiver 130 or the second example transceiver 140. In the illustrated example of FIG. 3, the example modem 105 is represented as a single housing including both the first example transceiver 130 and the second example transceiver 140. That is, a single housing is used that includes multiple transceivers. However, in some examples, the transceivers may be implemented outside of the housing. For example, one or more of the first example transceiver 130 and/or the second example transceiver 140 may be connected to the modem 105 via a modular interface such that different transceivers may be swapped in and/or out.

The example host interface 310 of the illustrated example of FIG. 3 is implemented using a serial host interface. However, any other type of host interface may additionally or alternatively be used such as, for example, a universal serial bus interface, a Universal Asynchronous Receiver/Transmitter (UART) interface, etc.

The example scheduler 320 the illustrated example of FIG. 3 includes a transceiver power detector 325, an effective rate detector 330, an example transmission time controller 335, an example utilization factor controller 340, an example memory 345, an example data allocator 350, and an example mode selector 355.

The example transceiver power detector 325 of the illustrated example of FIG. 3 detects power consumption levels of the first and second transceivers. In examples disclosed herein, power consumption levels of the first and second transceivers are measured during transmit modes (e.g., while data is being transmitted) and non-transmit modes (e.g., while data is being received, while the transceiver(s) are idle, while the transceiver(s) are in a shutdown mode, etc.).

The example effective rate detector 330 of the illustrated example of FIG. 3 detects effective transmission rates of the first and second transceivers. In examples disclosed herein, the effective transmission rate represents real-world transmission rates that account for factors such as, for example, data transmission capacity, transmission interference (which may require re-transmission of some data), etc. In some examples, the example effective rate detector 330 detects the effective transmission rates by monitoring data that is being transmitted by the transceivers. However, any other approach to monitoring an effective rate of transmission may additionally or alternatively be used. For example, the example effective rate detector 330 may cause dummy data to be transmitted, and may monitor the transmission of the dummy data.

The example transmission time controller 335 of the illustrated example of FIG. 3 schedules transmission time between the first and second example transceivers 130, 140. In some examples, the transmission time controller 335 solves for optimal transmission times among the first transceiver 130 and the second transceiver 140 as a function of utilization factors.

The example utilization factor controller 340 of the illustrated example of FIG. 3 performs a search of utilization factors to identify an optimal pair of utilization factors among the first and second transceivers 130, 140. As noted above, each of the utilization factors $\alpha_{RF}$ and $\alpha_{PLC}$ are bounded between zero and one, with zero representing no utilization and one representing full utilization. In examples disclosed herein, each pair of utilization factors is tested to determine an expected level of power consumption. The selected utilization factors can then be used to solve for the optimal transmission times which, in turn, can be used to schedule allocation of data for transmission among the first transceiver 130 and the second transceiver 140.

The example memory 345 of the illustrated example of FIG. 3 may be any device for storing data such as, for example, flash memory, magnetic media, optical media, etc. In the illustrated example, the memory 345 is random access memory of the modem 105. However, the example memory 345 may additionally or alternatively be implemented using any other type of memory. Furthermore, the data stored in the memory 345 may be in any data format such as, for example, binary data, comma delimited data, tab delimited data, structured query language (SQL) structures, etc. While in the illustrated example the memory 345 is illustrated as a single element, the memory 345 may be implemented by multiple memory elements (e.g., chips, dies, etc.), and/or be stored in multiple memory locations of the modem 105

The example data allocator 350 of the illustrated example of FIG. 3 receives data from the host interface 310 and, based on the transmission time information stored in the memory 345, allocates the received data to either the first transceiver 130 or the second transceiver 140 for transmission.

The example mode selector 355 of the illustrated example of FIG. 3 tests different modes of transmission for each of the transceivers 130, 140 to select modes that result in minimal power consumption. In some examples, the transceivers 130, 140 may support multiple different modes of communication. For example, a G3 PLC transceiver might implement different transmission modes including a robust modulation (ROBO) mode, a differential binary phase-shift keying (DBPSK) mode, a differential quadrature phase-shift keying (DQPSK) mode, and a differential 8-phase shift keying (D8PSK) mode. In some examples, the D8PSK mode has the highest data rate, but is less robust to noise, and thus requires more transmit power for reliable communication. In contrast, the ROBO mode results in the lowest data rate, but is more reliable, and thus requires less transmit power. Thus, in addition to selecting utilization times, in some examples, selection of an optimal transmission mode based is also beneficial. The example mode selector causes calculations to be mode for each of the potential mode combinations (e.g., a combination of a first mode for the first transceiver 130 and a second mode for the second transceiver 140), and selects mode(s) of communication that result in the lowest levels of power consumption.

While an example manner of implementing the example modem 105 of FIG. 1 is illustrated in FIG. 3, one or more of the elements, processes and/or devices illustrated in FIG. 3 may be combined, divided, re-arranged, omitted, eliminated and/or implemented in any other way. Further, the example first transceiver 130, the example second transceiver 140, the example host interface 310, the example transceiver power detector 325, the example effective rate detector 330, the example transmission time controller 335, the example utilization factor controller 340, the example memory 345, the example data allocator 350, the example mode selector 355, the example scheduler 320, and/or, more generally, the example modem 105 of FIG. 1 may be implemented by hardware, software, firmware and/or any combination of hardware, software and/or firmware. Thus, for example, any of the example first transceiver 130, the example second transceiver 140, the example host interface 310, the example transceiver power detector 325, the example effective rate detector 330, the example transmission time controller 335, the example utilization factor controller 340, the example memory 345, the example data allocator 350, the example mode selector 355, the example scheduler 320, and/or, more generally, the example modem 105 of FIG. 1 could be implemented by one or more analog or digital circuit(s), logic circuits, programmable processor (s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first transceiver 130, the example second transceiver 140, the example host interface 310, the example transceiver power detector 325, the example effective rate detector 330, the example transmission time controller 335, the example utilization factor controller 340, the example memory 345, the example data allocator 350, the example mode selector 355, the example scheduler 320, and/or, more generally, the example modem 105 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example modem 105 of FIG. 1 may include one or more elements, processes and/or devices in addition to, or instead of, those illustrated in FIG. 3, and/or may include more than one of any or all of the illustrated elements, processes and devices.

Figures 4, 5:
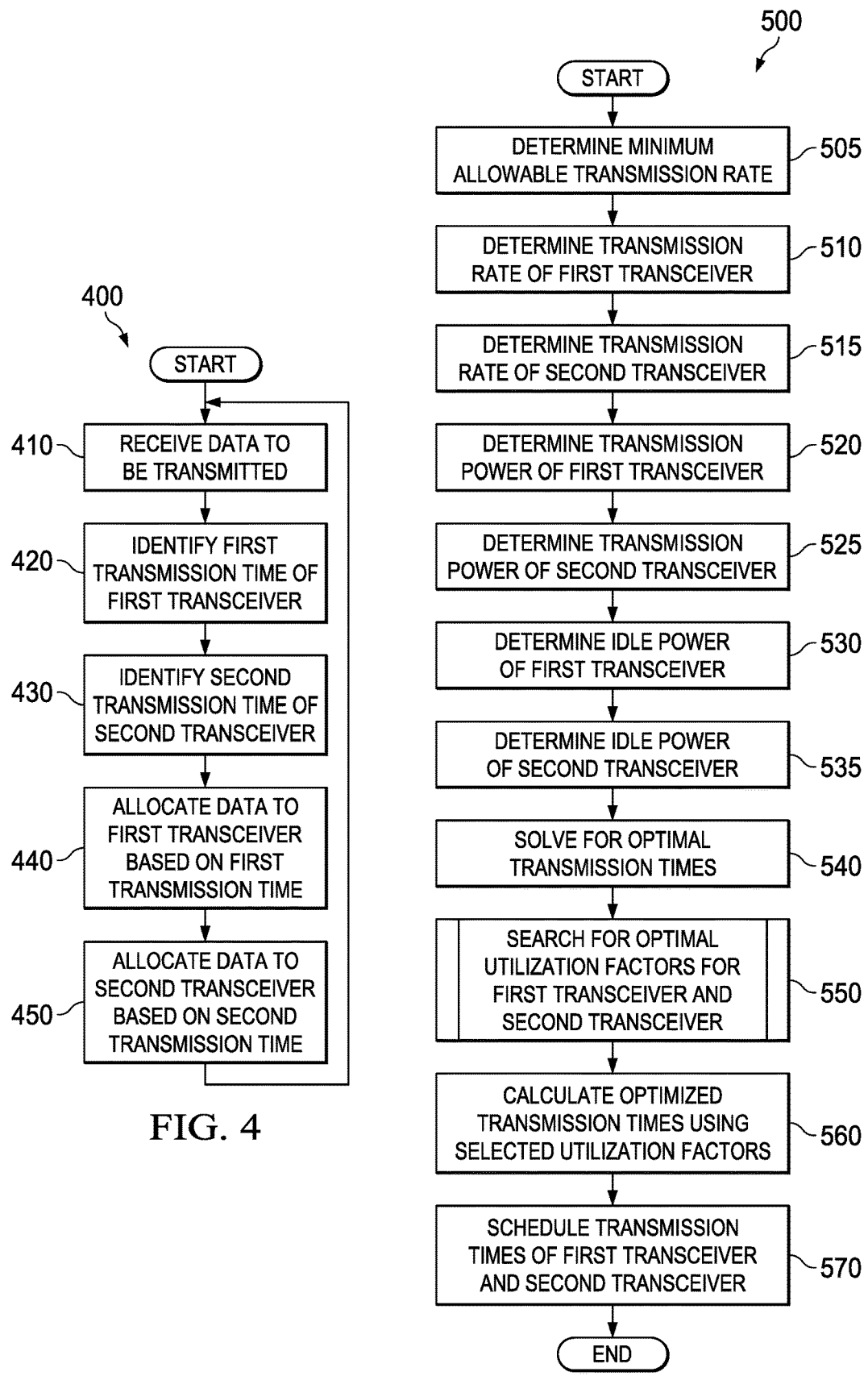
FIG. 4 is a flowchart representative of example machine-readable instructions that, when executed, cause the modem of FIGS. 1 and/or 3 to allocate received data for transmission among each of the transceivers of the example modem.
FIG. 5 is a flowchart representative of example machine-readable instructions that, when executed, cause the modem of FIGS. 1 and/or 3 to schedule transmission times for each of the transceivers of the example modem.
Figure 6:
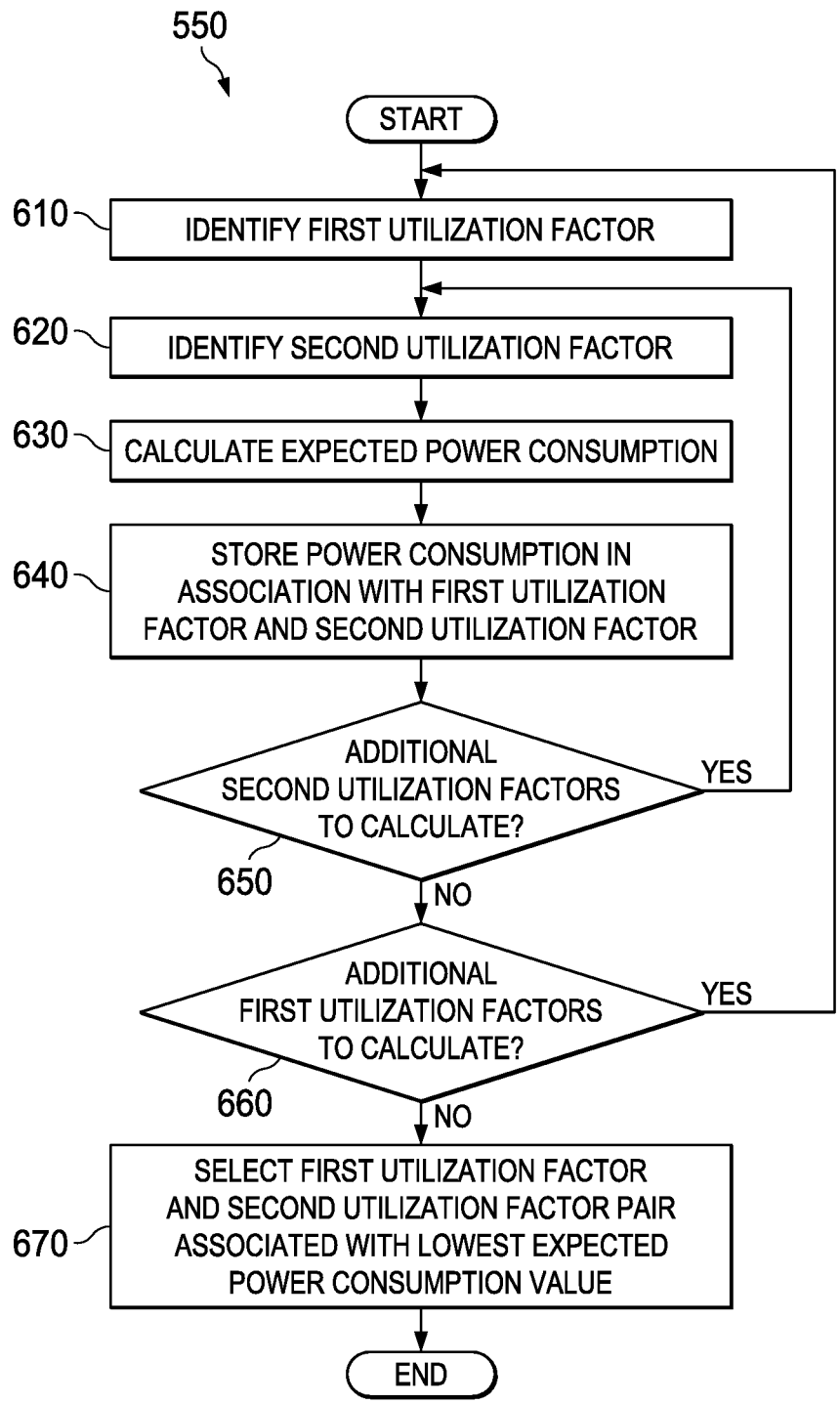
FIG. 6 is a flowchart representative of example machine-readable instructions that, when executed, cause the modem of FIGS. 1 and/or 3 to select utilization factors for each of the transceivers of the example modem.

Flowcharts representative of example machine readable instructions for implementing the example modem 105 of FIGS. 1 and/or 3 are shown in FIGS. 4, 5, 6, and/or 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4, 5, 6, and/or 7, many other methods of implementing the example modem 105 may alternatively be used. For example, the order of execution of the blocks may be changed, and/or some of the blocks described may be changed, eliminated, or combined.

As mentioned above, the example processes of FIGS. 4, 5, 6, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of example machine-readable instructions 400 that, when executed, cause the modem of FIGS. 1 and/or 3 to allocate received data for transmission among each of the transceivers 130, 140 of the example modem 105. The example process 400 of the illustrated example of FIG. 4 begins when the example host interface 310 receives data to be transmitted from a host (block 410). The host interface 310 passes the data to the data allocator 350 for allocation between the first example transceiver 130 and the second example transceiver 140.

The example data allocator 350 identifies a first transmission time of the first transceiver 130 (block 420). In the illustrated example of FIG. 4, the example data allocator 350 identifies the first transmission time of the first transceiver 130 by reading a first value from the memory 345 as stored by the transmission time controller 335. The example data allocator 350 identifies a second transmission time of the second transceiver 140 (block 430). In the illustrated example of FIG. 4, the example data allocator 350 identifies the second transmission time of the second transceiver 140 by reading a second value from the memory 345 as stored by the transmission time controller 335. In the illustrated example of FIG. 4, the values read from the memory 345 represent durations for which the first and second transceivers 130, 140 will be allowed to transmit data before returning to a receive mode and/or idle mode. While in the illustrated example of FIG. 4, the first and second transmission times are identified by reading values from the memory 345, any other approach to determining the transmission times may additionally or alternatively be used.

The example data allocator 350 allocates a first portion of the data to be transmitted to the first transceiver based on the first transmission time (block 440). The example data allocator 350 allocates a second portion of the data to be transmitted to the second transceiver 140 based on the second transmission time (block 450). In the illustrated example of FIG. 4 data is allocated to the first and second transceivers 130, 140 such that the first and second transceivers, when transmitting data at their respective data rates, will transmit data for their respective transmission times. The example process 400 of the illustrated example of FIG. 4 is then repeated for subsequently received data.

FIG. 5 is a flowchart representative of example machine-readable instructions 500 that, when executed, cause the modem 105 of FIGS. 1 and/or 3 to schedule transmission times for each of the transceivers 130, 140 of the example modem 105. In examples disclosed herein, the example process 500 of FIG. 5 is repeated upon power being applied to the modem 105 (e.g., upon restart). However, the example process 500 of the illustrated example of FIG. 5 may repeatedly using any other periodic and/or aperiodic approach.

As noted above in connection with FIG. 2, example approaches disclosed herein utilize a few assumptions for scheduling the data transmission between the first transceiver and the second transceiver. Such assumptions can be used as inputs to an energy consumption equation, Equation 3, below:

$$E(\alpha_{RF}, \alpha_{PLC}, T_{RF}, T_{PLC}) = \alpha_{RF}[(P_{RF}^{TX} - P_{RF}^{RX})T_{RF} + P_{RF}^{RX}] + \alpha_{PLC}[(P_{PLC}^{TX} - P_{PLC}^{RX})T_{PLC} + P_{PLC}^{RX}] \quad \text{Equation 3}$$

As noted above, $\alpha_{RF}$, $\alpha_{PLC}$ represent utilization factors of the RF transceiver (e.g., the first transceiver 130) and PLC transceiver (e.g., the second transceiver 140), respectively. $T_{RF}$ and $T_{PLC}$ represent transmission times of the RF transceiver (e.g., the first transceiver 130) and the PLC transceiver (e.g., the second transceiver 140), respectively. $P_{RF}^{TX}$ and $P_{PLC}^{TX}$ represent powers consumed by the RF transceiver (e.g., the first transceiver 130) and the PLC transceiver (e.g., the second transceiver 140), respectively, when transmitting data. $P_{RF}^{RX}$ and $P_{PLC}^{RX}$ represent powers consumed by the RF transceiver (e.g., the first transceiver 130) and the PLC transceiver (e.g., the second transceiver 140), respectively, when not transmitting data (e.g., when in a receive mode and/or an idle mode).

An example power consumption minimization scheme based on the above conditions can be shown by Equation 4, below:

$$\min_{\alpha_{RF}, \alpha_{PLC}, T_{RF}, T_{PLC}} E(\alpha_{RF}, \alpha_{PLC}, T_{RF}, T_{PLC}) \quad \text{Equation 4}$$

such that $$T_{RF} \leq 1$$

$$T_{PLC} \leq 1$$

$$\alpha_{RF} R_{RF} T_{RF} + \alpha_{PLC} R_{PLC} T_{PLC} \geq R_{min}$$

$$\alpha_{RF}, \alpha_{PLC} \in \{0,1\}$$

In examples disclosed herein, the above power minimization scheme can be solved using a two-step optimization process. In examples disclosed herein, linear programming is used to determine $T_{RF}$ and $T_{PLC}$ as functions of $\alpha_{RF}$ and $\alpha_{PLC}$. Brute force searching is then performed for values of $\alpha_{RF}$ and $\alpha_{PLC}$ (which are constrained to values between zero and one, thereby limiting the search space), to find values for $T_{RF}$ and $T_{PLC}$ that minimize power consumption.

The example process 500 of the illustrated example of FIG. 5 begins when the example utilization factor controller 340 determines a minimum allowable transmission rate (block 505). In the illustrated example of FIG. 5, the minimum allowable transmission rate is stored as a value in the memory 345 and, in some examples, may be user adjustable and/or configurable. The example utilization factor controller 340 reads the minimum allowable transmission rate value from the memory 345. However, the minimum allowable transmission rate may be determined using any other approach.

The example effective rate detector 330 determines a first effective transmission rate of the first transceiver 130 (block 510). The example effective rate detector 330 determines a second effective transmission rate of the second transceiver 140 (block 515). In some examples, the example effective rate detector 330 determines the first example effective transmission rate and the second example effective transmission rate by monitoring communications of the respective transceiver(s). The effective transmission rate(s) may vary based on a number of different conditions such as, for example, network congestion, radio interference, etc.

The example transmission power detector 325 determines first transmission power of the first transceiver 130 (block 520). The example transmission power detector 325 determines a second transmission power of the second transceiver 140 (block 525). In the illustrated example of FIG. 5, the example transceiver power detector 325 identifies the first and second transmission powers by monitoring power consumed by each of the respective transceivers. In some examples, the power used by the first transceiver 130 when transmitting data is different than the power used by the second transceiver 140 when transmitting data. Understanding the amount of power consumed by transmitting data with respect to each of the transceivers is an important factor in subsequently allocating data among those transceivers when attempting to optimize the amount of aggregate power consumed.

The example transmission power detector 325 determines a first idle power of the first transceiver 130 (block 530). The example transmission power detector 325 determines a second transmission power of the second transceiver 140 (block 535). In the illustrated example of FIG. 5, the example transceiver power detector 325 identifies the first and second idle powers by then monitoring power consumed by each of the respective transceivers when in an idle mode. While in the illustrated example of FIG. 5, power consumed while in an idle mode is detected, any other mode of operation may additionally or alternatively be used such as, for example, a sleep mode, a receive mode, a shutdown mode, etc. Having an understanding of the amount of power consumed by the transceivers while transmitting and idling, the effective rates of the transceivers, and a minimum desired data rate, the example transmission time controller 335 solves for optimal transmission times among the first transceiver 130 and the second transceiver 140 (block 540).

Having identified input variables to Equation 3, shown above, the example utilization factor controller 340 performs a first optimization calculation to determine optimal transmission times given the determined input variables determined in connection with blocks 505, 510, 515, 520, 525, 530, and 535 as a function(s) of first and second utilization factors corresponding to the first and second transceivers. The following variant of Equation 4 (see Equation 5, below) is then solved to identify expected energy consumption given different utilization factors.

$$\min_{T_{RF}, T_{PLC}} E(T_{RF}, T_{PLC} \mid \alpha_{RF}, \alpha_{PLC}) \quad \text{Equation 5}$$

such that $$T_{RF} \leq 1$$

$$T_{PLC} \leq 1$$

$$\alpha_{RF} R_{RF} T_{RF} + \alpha_{PLC} R_{PLC} T_{PLC} \geq R_{min}$$

The example Equation 5, shown above, removes the last condition of equation 4. The result of solving for Equation 5 is two equations that show $T_{PLC}^{opt}$ and $T_{RF}^{opt}$ as functions of the utilization factors $\alpha_{RF}$ and $\alpha_{PLC}$.

The example utilization factor controller 340 searches for optimized utilization factors for the first transceiver and the second transceiver (block 550). In examples disclosed herein, the utilization factor controller 340 searches for optimized utilization factors using a brute force search approach. An example implementation of the search approach is disclosed below in connection with FIG. 6. As a result of the search, the utilization factor controller 340 identifies first and second utilization factors that can be used to calculate the optimized transmission times. The example transmission time controller 335 uses the first and second utilization factors to calculate the optimized transmission times (block 560).

The example transmission time controller 335 then schedules transmission times of the first transceiver 130 and the second transceiver 140 by storing each of the transmission times in the memory 345. As described above in connection with FIG. 4, when data is received at the data allocator 350 for transmission via the transceivers 130, 140, the example data allocator 350 reads the transmission time values stored in the memory to facilitate allocation of the data among the first transceiver 130 and the second transceiver 140. The example process 500 of FIG. 5 and terminates. As noted above, the example process 500 of the illustrated example of FIG. 5 may be repeated periodically and/or a periodically to update the transmission times stored in the memory 345. In some examples, changing conditions (e.g., network congestion, RF interference, changes in power consumption, etc.) may result in different transmission times for scheduling data for transmission among the first transceiver 130 and second transceiver 140.

FIG. 6 is a flowchart representative of example machine-readable instructions 550 that, when executed, cause the modem 105 of FIGS. 1 and/or 3 to select utilization factors for each of the transceivers 130, 140 of the example modem 105. The example process 550 of the illustrated example of FIG. 6 begins when the example utilization factor controller receives the optimal transmission time equation(s) from the transmission time controller 335. As described above in connection with FIG. 5, the optimal transmission times are a function of utilization factors corresponding to each of the transceivers 130, 140. The example utilization factor controller 340 identifies a first utilization factor (block 610). The first example utilization factor corresponds to utilization of the first transceiver 130. The example utilization factor controller 340 identifies a second utilization factor (block 620). The second example utilization factor corresponds to utilization of the second transceiver 140.

The example utilization factor controller 340, using the first utilization factor and second utilization factor, calculates an expected power consumption value (block 630). The example utilization factor controller 340 stores the power consumption value in association with the first utilization factor and second utilization factor pair (block 640). The example power consumption value is stored in the memory 345. In some examples, expected power consumption values are only calculated and/or saved when the tested utilization factors would result in communications that achieve the minimum desired data transfer rate, according to Equation 6, below:

$$\alpha_{RF}R_{RF}T_{RF}^{opt}+\alpha_{PLC}R_{PLC}T_{PLC}^{opt} \geq R_{min} \qquad \text{Equation 6}$$

In the illustrated example of FIG. 6, the example utilization factor controller 340 identifies whether any additional second utilization factors exist for calculation of their corresponding power consumption values in connection with the first utilization factor (block 650). If additional second utilization factors exist (block 650 returns a result of YES), the example utilization factor controller identifies the next second utilization factor (block 620), calculates the expected power consumption (block 630), and stores the power consumption value in association with the new first utilization factor and second utilization factor pair (block 640). The example process of blocks 620 through 650 is repeated until power consumption values have been calculated in connection with all possible second utilization factors (e.g., until block 650 returns a result of NO).

The example utilization factor controller 340 identifies whether any additional first utilization factors exist for calculation of their corresponding power consumption values (block 660). If additional first utilization factors exist (block 660 returns a result of YES), the example utilization factor controller 340 identifies the next first utilization factor block 610. The example process of block 610 through block 660 is repeated until power consumption values have been calculated in connection with all possible first utilization factor and second utilization factor pairs (e.g., until block 660 returns a result of NO).

Having stored power consumption values in connection with each of the first utilization factor and second utilization factor pairs in the memory 345, the example utilization factor controller 340 selects a first utilization factor and second utilization factor pair associated with the lowest power consumption value (block 670). The selected utilization factors are then used in connection with block 560 of FIG. 5 to calculate optimized transmission times using the selected utilization factors.

Because the ranges of utilization factors are each bounded to values between zero and one, there are a finite number of possible utilization factor pairs that may be used to identify the optimal transmission times. In examples disclosed herein, the example utilization factor controller 340 first identifies a first utilization factor of zero and a second utilization factor of zero, and increments the second utilization factor by one tenth until reaching a value of one for the second utilization factor. The first utilization factor is then incremented by one tenth, and a range of values from zero to one, incremented by one tenth, are used for the second utilization factor. The process is repeated until the first utilization factor reaches one. While in the illustrated example of FIG. 6 utilization factors are incremented by one tenth, any other incremental value may additionally or alternatively be used such as, for example, one hundredth, one thousandth, etc.

Moreover, while in the illustrated example of FIG. 6, a sweep of values from zero to one is performed, any other approach for optimizing utilization factors may additionally or alternatively be used. For example, prior utilization factor values may be used to start the search process. Using prior utilization factor values, which were likely determined under similar conditions, enables the search algorithm to find the optimal utilization factors more quickly. In some examples, instead of waiting until all power consumption values have been computed, power consumption values associated with subsequent iterations of first utilization factor and second utilization factor pairs may be analyzed to compare the calculated power consumption value to power consumption values calculated for other nearby first utilization factor and second utilization factor pairs. Performing such a comparison enables the utilization factor controller 340 to stop searching when a point is reached where the first utilization factor and second utilization factor pairs result in greater power consumption values.

In some examples, additional optimization(s) may be performed. For example, in some transceivers support multiple different modes of communication. For example, a G3 PLC transceiver might implement different transmission modes including a robust modulation (ROBO) mode, a differential binary phase-shift keying (DBPSK) mode, a differential quadrature phase-shift keying (DQPSK) mode, and a differential 8-phase shift keying (D8PSK) mode. In some examples, the D8PSK mode has the highest data rate, but is less robust to noise, and thus requires more transmit power for reliable communication. In contrast, the ROBO mode results in the lowest data rate, but is more reliable, and thus requires less transmit power. In addition to selecting utilization times, in some examples, selection of an optimal transmission mode based is also beneficial.

Figure 7:
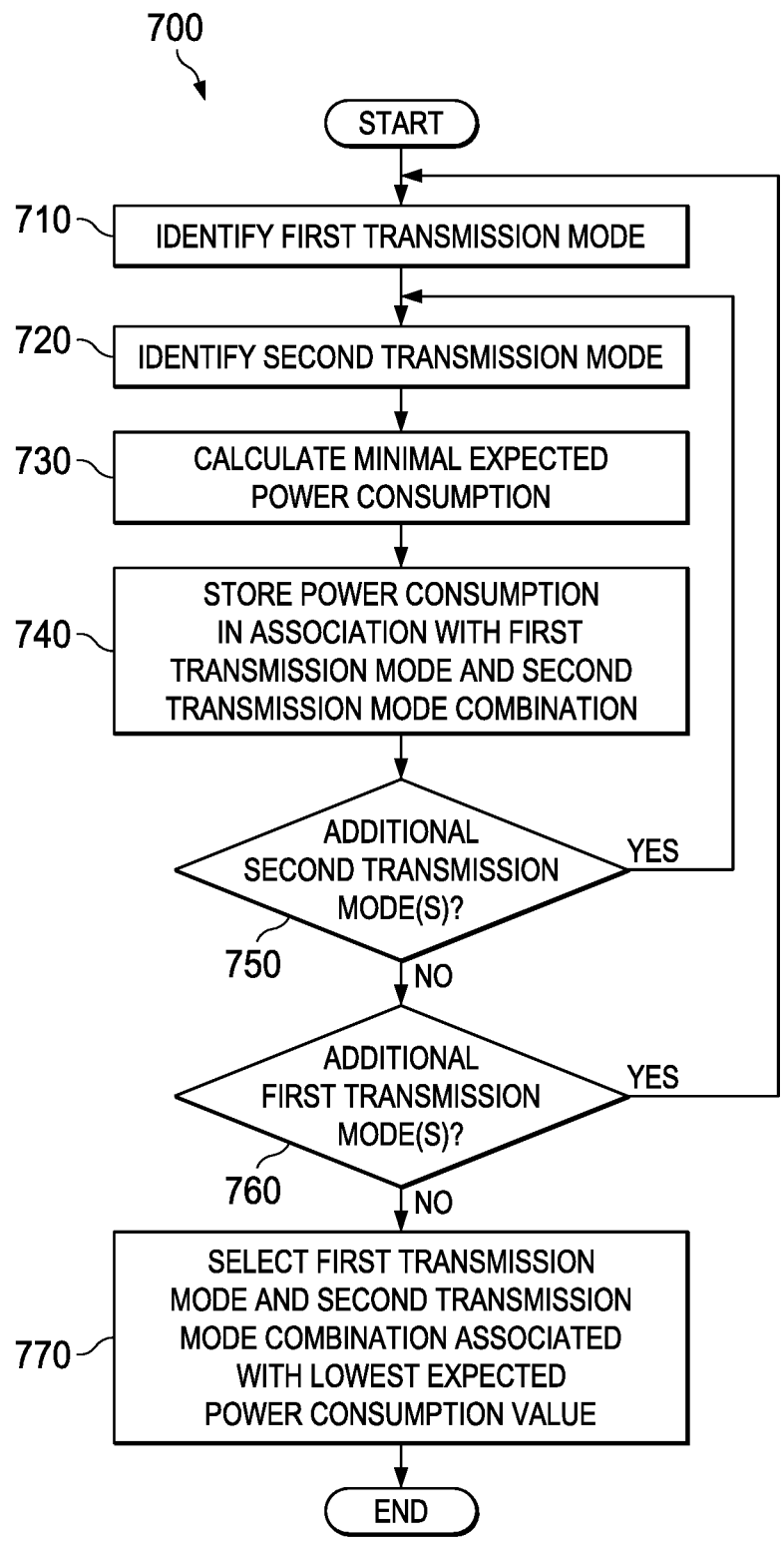
FIG. 7 is a flowchart representative of example machine-readable instructions that, when executed, cause the modem of FIGS. 1 and/or 3 to select transmission modes for each of the transceivers of the example modem.

FIG. 7 is a flowchart representative of example machine-readable instructions 700 that, when executed, cause the modem 105 of FIGS. 1 and/or 3 to select utilization factors for each of the transceivers 130, 140 of the example modem 105. The example process 700 of the illustrated example of FIG. 7 begins when the example mode selector 355 identifies a first transmission mode of the first transceiver 130 (block 710). The example mode selector 355 identifies a second transmission mode of the second transceiver (block 720). The example mode selector 355 then causes the minimal expected power consumption for the first mode and second mode combination to be identified (block 730). In some examples, the minimal expected power consumption value is identified by performing the process 500 of FIG. 5. As such, the minimal expected power consumption given the mode(s) of communication specified by the first and second modes is identified. The minimal expected power consumption value is stored in connection with the first transmission mode and second transmission mode combination (block 740) by the mode selector 355. The example mode selector 355 identifies whether any additional second transmission mode(s) exist for testing (block 750). If any additional second modes exist (e.g., block 750 returns a result of YES), the process of block 720 through block 750 is repeated until no additional second transmission mode(s) exist for testing. When no additional second transmission mode(s) exist for testing (e.g., when block 750 returns a result of NO), the example mode selector 355 identifies whether any additional first transmission mode(s) exist for testing (block 760). If any additional first transmission modes exist (e.g., block 760 returns a result of YES), the process of block 710 through block 760 is repeated until no additional first transmission mode(s) exist for testing. When no additional first transmission mode(s) exist for testing (e.g., when block 760 returns a result of NO), the example mode selector 355 selects the first transmission mode and second transmission mode combination that results in the lowest expected power consumption value. Note that each of the combinations of first and second modes might result in different transmission times and/or utilization factors based on the varying power consumption values and/or transmission rates associated with the modes within that combination.

Figure 8:
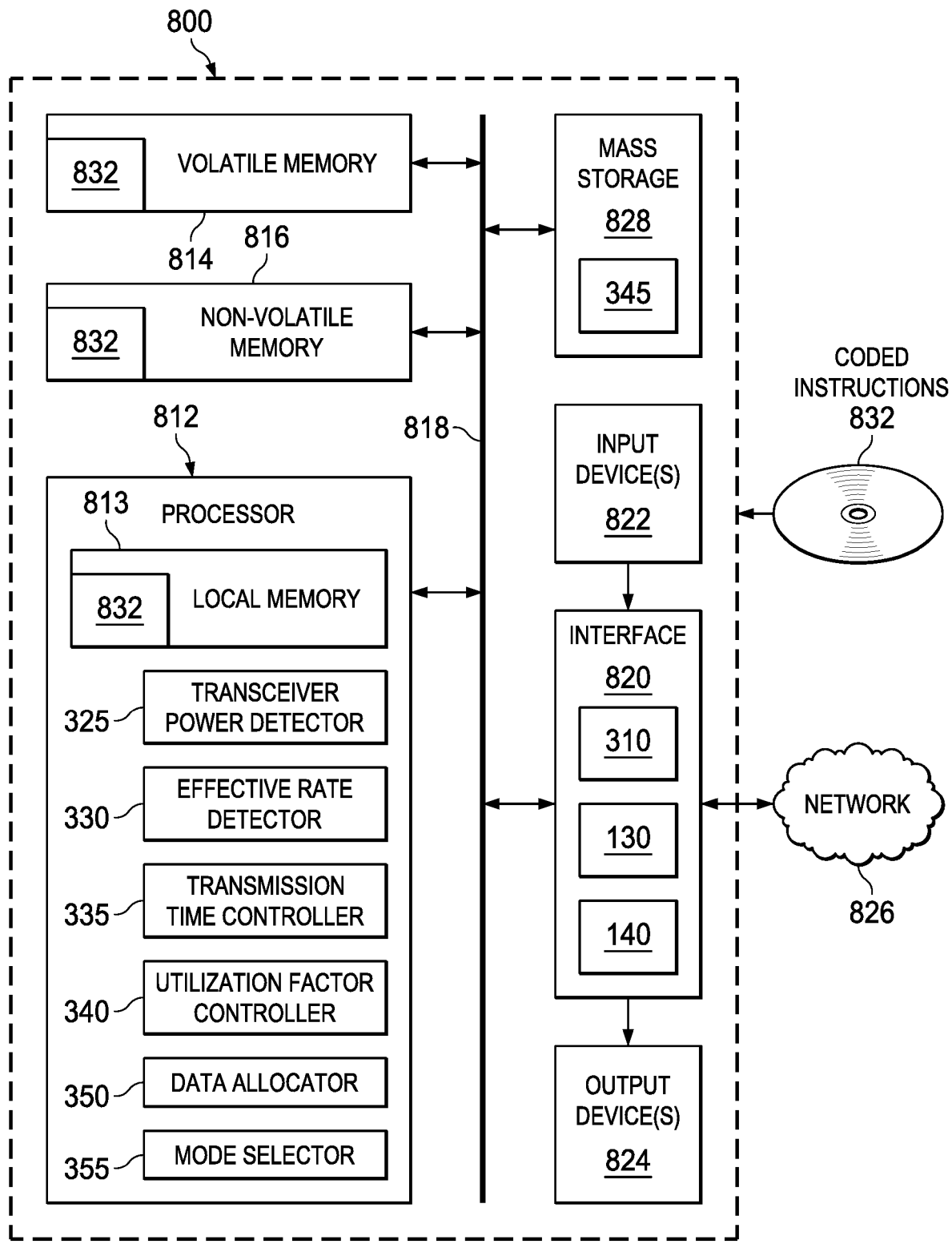
FIG. 8 is a block diagram of an example processor platform 700 capable of executing the instructions of FIGS. 4, 5, and/or 6 to implement the modem of FIGS. 1 and/or 3.

FIG. 8 is a block diagram of an example processor platform 800 capable of executing the instructions of FIGS. 4, 5, 6, and/or 7 to implement the modem 105 of FIGS. 1 and/or 3. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache) and executes instructions to implement the example transceiver power detector 325, the example effective rate detector 330, the example transmission time controller 335, the example utilization factor controller 340, the example data allocator 350, and/or the example mode selector 355. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.). In some examples, the interface circuit 820 implements the example host interface 310, the example first transceiver 130, and/or the example second transceiver 140.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4, 5, 6, and/or 7 may be stored in the mass storage device 828, in the volatile memory 814, in the non-volatile memory 816, and/or on a removable tangible computer readable storage medium such as a CD or DVD. In some examples, the example mass storage device 828 implements the example memory 345.

From the foregoing, it will appreciate that the above disclosed methods, apparatus and articles of manufacture enable scheduling of data for transmission among two or more transceivers. In examples disclosed herein, energy consumption of the modem including the two transceivers is reduced by scheduling data for transmission using the two transceivers based on their respective transmission capacities, power consumption levels, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A modem, comprising:
a radio frequency (RF) transceiver;
a power-line communication (PLC) transceiver;
a processor coupled to the RF transceiver and to the PLC transceiver, the processor configured to:
 calculate a first plurality of power consumption values corresponding to a first plurality of utilization factors, the first plurality of utilization factors corresponding to the RF transceiver;
 calculate a second plurality of power consumption values corresponding to a second plurality of utilization factors, the second plurality of utilization factors corresponding to the PLC transceiver, the first plurality of power consumption values and the second plurality of power consumption values forming a plurality of power consumption value pairs, and the first plurality of utilization factors and the second plurality of utilization factors forming a plurality of utilization factor pairs;
 select a first utilization factor pair and second utilization factor pair based on the plurality of power consumption value pairs;
 calculate a first transmission time for the RF transceiver based on the first utilization factor pair and second utilization factor pair;
 calculate a second transmission time for the PLC transceiver based on the first utilization factor pair and the second utilization factor pair; and
 allocate data for transmission by the RF transceiver or by the PLC transceiver according to the first transmission time and the second transmission time, to generate a selected transceiver; and
 wherein the selected transceiver is configured to transmit the data.

2. The modem of claim 1, wherein the processor is further configured to detect a first transmit power value of the RF transceiver and a second transmit power value of the PLC transceiver.

3. The modem of claim 2, wherein the first transmit power value represents power consumed by the RF transceiver in a transmit mode and the second transmit power value represents power consumed by the PLC transceiver in a transmit mode.

4. The modem of claim 2, wherein calculating the first plurality of power consumption values is performed based on the first transmit power value, and calculating the second plurality of power consumption values is performed based on the second transit power value.

5. The modem of claim 1, wherein the processor is further configured to detect a first transmission rate of the RF transceiver and a second transmission rate of the PLC transceiver.

6. The modem of claim 5, wherein the processor is configured to calculate the first plurality of power consumption values and the second plurality of power consumption values, in response to determining that the first utilization factor results in a transmission rate that is greater than or equal to a minimum transmission rate.

7. The modem of claim 1, wherein the processor is further configured to:
 identify a plurality of mode pairs, each mode pair comprising a first mode of the RF transceiver and a second mode of the PLC transceiver;
 estimate a plurality power consumption values for the plurality of mode pairs; and
 select a first mode pair of the plurality of mode pairs based on the plurality of power consumption value pairs.

8. The modem of claim 1, wherein the RF transceiver and the PLC transceiver are in a single housing.

9. A method, comprising:
 calculating, by at least one processor, a first plurality of power consumption values corresponding to a first plurality of utilization factors, the first plurality of utilization factors corresponding to a radio frequency (RF) transceiver;
 calculating, by the at least one processor, a second plurality of power consumption values corresponding to a second plurality of utilization factors, the second plurality of utilization factors corresponding to a power-line communication (PLC) transceiver, the first plurality of power consumption values and the second plurality of power consumption values forming a plurality of power consumption value pairs, and the first plurality of utilization factors and the second plurality of utilization factors forming a plurality of utilization factor pairs;
 selecting, by the at least one processor, a first utilization factor pair and second utilization factor pair based on the plurality of power consumption value pairs;
 calculating, by the at least one processor, a first transmission time for the RF transceiver based on the first utilization factor pair and second utilization factor pair;
 calculating, by the at least one processor, a second transmission time for the PLC transceiver based on the first utilization factor pair and the second utilization factor pair;
 allocating, by the at least one processor, data for transmission by the RF transceiver or by the PLC transceiver according to the first transmission time and the second transmission time, to generate a selected transceiver; and
 transmitting, by the selected transceiver, the data.

10. The method of claim 9, further comprising detecting a first transmit power value of the RF transceiver and a second transmit power value of the PLC transceiver.

11. The method of claim 10, wherein the first transmit power value represents power consumed by the RF transceiver in a transmit mode and the second transmit power value represents power consumed by the PLC transceiver in a transmit mode.

12. The method of claim 10, wherein calculating the first plurality of power consumption values is performed based on the first transmit power value, and calculating the second plurality of power consumption values is performed based on the second transit power value.

13. The method of claim 9, further comprising detecting a first transmission rate of the RF transceiver and a second transmission rate of the PLC transceiver.

14. The method of claim 13, further comprising calculating the first plurality of power consumption values and the second plurality of power consumption values, in response to determining that the first utilization factor results in a transmission rate that is greater than or equal to a minimum transmission rate.

15. The method of claim 9, further comprising:
identifying a plurality of mode pairs, each mode pair comprising a first mode of the RF transceiver and a second mode of the PLC transceiver;
estimating a plurality power consumption values for the plurality of mode pairs; and
selecting a first mode pair of the plurality of mode pairs based on the plurality of power consumption value pairs.

16. A modem, comprising:
a radio frequency (RF) transceiver;
a power-line communication (PLC) transceiver;
a processor coupled to the RF transceiver and to the PLC transceiver; and
a non-transitory computer readable storage medium comprising program instructions for execution by the processor, to cause the processor to:
calculate a first plurality of power consumption values corresponding to a first plurality of utilization factors, the first plurality of utilization factors corresponding to the RF transceiver;
calculate a second plurality of power consumption values corresponding to a second plurality of utilization factors, the second plurality of utilization factors corresponding to the PLC transceiver, the first plurality of power consumption values and the second plurality of power consumption values forming a plurality of power consumption value pairs, and the first plurality of utilization factors and the second plurality of utilization factors forming a plurality of utilization factor pairs;
select a first utilization factor pair and second utilization factor pair based on the plurality of power consumption value pairs;
calculate a first transmission time for the RF transceiver based on the first utilization factor pair and second utilization factor pair;
calculate a second transmission time for the PLC transceiver based on the first utilization factor pair and the second utilization factor pair; and
allocate data for transmission by the RF transceiver or by the PLC transceiver according to the first transmission time and the second transmission time, to generate a selected transceiver; and
wherein the selected transceiver is configured to transmit the data.

17. The modem of claim 16, wherein the program instructions further comprise program instructions to cause the processor to detect a first transmit power value of the RF transceiver and a second transmit power value of the PLC transceiver.

18. The modem of claim 16, wherein the program instructions further comprise program instructions to cause the processor to detect a first transmission rate of the RF transceiver and a second transmission rate of the PLC transceiver.

19. The modem of claim 16, wherein the program instructions further comprise program instructions to cause the processor to calculate the first plurality of power consumption values and the second plurality of power consumption values, in response to determining that the first utilization factor results in a transmission rate that is greater than or equal to a minimum transmission rate.

20. The modem of claim 16, wherein the program instructions further comprise program instructions to cause the processor to:
identify a plurality of mode pairs, each mode pair comprising a first mode of the RF transceiver and a second mode of the PLC transceiver;
estimate a plurality power consumption values for the plurality of mode pairs; and
select a first mode pair of the plurality of mode pairs based on the plurality of power consumption value pairs.

* * * * *